United States Patent [19]
Ochiai et al.

[11] 3,837,070
[45] Sept. 24, 1974

[54] AUTOMATIC TOOL CHANGE APPARATUS

[75] Inventors: Yoshiki Ochiai, Okazaki; Kazuhiro Sakane, Kariya, both of Japan

[73] Assignee: Toyoda Koki Kabushiki Kaisha, Aichi-ken, Japan

[22] Filed: Oct. 6, 1972

[21] Appl. No.: 295,738

[30] Foreign Application Priority Data
Oct. 6, 1971  Japan.............................. 46-78582

[52] U.S. Cl. ................................................ 29/568
[51] Int. Cl........................................... B23q 3/157
[58] Field of Search............ 29/568, 26 A; 279/1 TS, 279/1 ME

[56] References Cited
UNITED STATES PATENTS 3,576,540  4/1971  Fair et al. .......................... 29/568 X
3,613,225  10/1971  Sato et al................................. 29/568
3,689,988  9/1972  Jerue ..................................... 29/568

Primary Examiner—Andrew R. Juhasz
Assistant Examiner—Z. R. Bilinsky
Attorney, Agent, or Firm—Oblon, Fisher, Spivak, McClelland & Maier

[57] ABSTRACT

An automatic tool change apparatus is provided for a numerically controlled machine tool including a tool holder stored in a tool magazine and being transferable together with a tool sleeve which prevents dust in the atmosphere from becoming attached to the shank portion thereof, so as to assure a snug engagement between the tool holder and a tool spindle, and therefore to obtain a high degree of machining accuracy. The tool sleeve is loaded onto the tool magazine by a sub-transfer arm by moving the same radially of the tool magazine, and then axially of the tool sleeve.

7 Claims, 6 Drawing Figures

AUTOMATIC TOOL CHANGE APPARATUS

BACKGROUND OF THE INVENTION

The present invention relates to an automatic tool change apparatus capable of automatically exchanging tools between a tool magazine and a tool spindle of a numerically controlled machine tool.

Conventionally, the tools which are interchanged by an automatic tool change apparatus are exposed to dust which is present in the atmosphere, and thus such dust often is attached on the tool holder shank which is then engaged with a receiving portion of a tool spindle. Accordingly, the tool holder and the spindle are not snugly engaged with each other so that a high degree of machining accuracy may not be obtained.

SUMMARY OF THE INVENTION

It is, therefore, an object of the present invention to provide an automatic tool change apparatus wherein a tool holder is stored in a tool magazine and is transferred together with a tool sleeve to thereby prevent dust in the atmosphere from attaching itself to the shank portion of the tool holder.

Another object of the present invention is to provide an automatic tool change apparatus wherein a tool sleeve having a tool holder is removed from a tool magazine by moving the same in an axial direction thereof through a predetermined distance, and then, by moving the same radially of the tool magazine.

Still another object of the present invention is to provide an automatic tool change apparatus wherein a tool sleeve is clamped by the fingers of a tool transfer means on the outside of a tool magazine so that the fingers do not interfere with tool sleeves in the neighborhood, whereby a maximum number of tool holders may be stored in the tool magazine.

According to the present invention, a tool sleeve is provided to prevent the dust particles in the atmosphere from attaching to the shank of the tool holder, and the tool holder is always contained in the tool sleeve except during the time when the tool holders are being interchanged between the tool spindle and a tool change position.

Furthermore, the tool holder is loaded in the tool magazine together with the tool sleeve by combining the radial and axial movements thereof so that the tool sleeve is never disengaged by the centrifugal force thereon from the tool magazine without any special actuating mechanism for holding the tool sleeve.

BRIEF DESCRIPTION OF THE DRAWINGS

Other objects, features and attendant advantages of the invention will be more fully appreciated as the same becomes better understood from the following detailed description of a preferred embodiment of the invention when considered in connection with the accompanying drawing, in which like reference characters designate like or corresponding parts throughout the several views, and wherein.

DETAILED DESCRIPTION OF A PREFERRED EMBODIMENT

Figure 1:
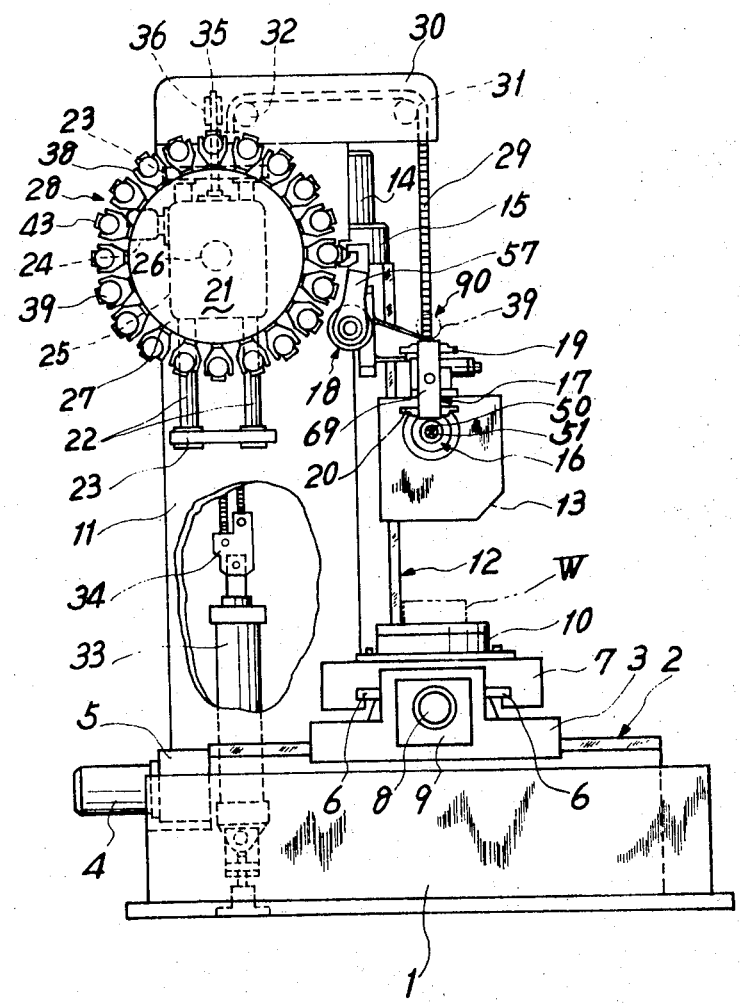
FIG. 1 shows a numerically controlled machine tool having an automatic tool change apparatus according to the present invention.

Referring now to the drawings, and more particulary to FIG. 1 thereof, a numerically controlled machine tool with an automatic tool change apparatus is shown having a bed 1 on which a column 11 is upstandingly mounted. The bed 1 has guide ways 2 longitudinally disposed thereon which support a saddle 3 being movable thereon along one side of the column 11 by a driving motor 4 through a transmission mechanism 5. The saddle 3 is likewise formed with guide ways 6 which run transversely to the guide ways 2 and carry a table 7 which is movable toward and away from the column 11 by a feed motor 8 through a transmission box 9. Rotatably mounted on the table 7 is a turntable 10 on which a workpiece W is mounted to be machined by a tool 50.

A spindle head 13 is secured to the column 11 on vertical guide ways 12 and a power driven screw, not shown, is driven by a driving motor 14 through a transmission box 15 to position the spindle head 13 vertically on the guide ways 12. A tool spindle 16 is rotatably supported in the spindle head 13, being adapted to carry a tool holder 51 transferred from a tool magazine 21. It is to be noted that the tool 50 is always mounted on a tool holder 51.

An intermediate transfer device 18 and a tool transfer device 17 which are operative to transfer the tool holder from the tool magazine 21 to the tool spindle 16, and vice versa, are arranged on the spindle head 13. A transfer arm 69 is connected to a rotary-reciprocatory actuator, not shown, and is provided with pairs of fingers 19, 20 at both ends thereof, which may clamp the tool holders by operation of actuators 72a and 72b, FIG. 2, on the tool spindle 16, and a sub-transfer arm 57 at a tool change position of 90.

Other details of the rotary-reciprocatory actuator are shown in U.S. Pat. Application Ser. No. 861,666 filed Sept. 26, 1969 now U.S. Pat. No. 3,775,837.

When the tool holders are clamped by the fingers 19, 20, the transfer arm 69 is axially shifted until the tool holders are disengaged from the tool spindle 16 and their respective tool sleeves 39 and turned through 180°, and then is retracted in an axial direction, whereby the tool holders are interchanged therebetween. While a machining operation is performed, the transfer arm 69 is kept positioned in a vertical orientation so that the next tool change operation may be carried out in the shortest possible time.

A housing 25, on which a driving motor 24 and a transmission mechanism are loaded, is slidably mounted on vertical ways 22 secured to the column 11 by means of supporting blocks 23. A magazine disc 27, on which a plurality of tool holding devices 28 are disposed, is rotated by the driving motor 24 through a spindle 26 rotatably mounted on the housing 25.

A synchronizing device for the spindle head 13 and the tool magazine 21 will now be described.

One end of a chain 29 is fixed to the upper portion of the spindle head 13 and the other end thereof is connected to a bracket 34 which is pivotably mounted on a piston rod of a balancing actuator 33. The chain 29 is supported intermediate its ends by sprockets 31, 32 which are mounted on a frame 30 on the upper end of the column 11.

Similarly supported by sprockets 36 on the frame 30 is a chain 35 which is connected to the bracket 34 and the housing 25 at both ends thereof.

It is to be noted that the total weight of the spindle head 13 and the tool magazine 21 is almost equal to the balancing force of the balancing actuator 33.

Accordingly, the tool magazine 21 and the spindle head 13 are always maintained in the same relative position, because when the spindle head 13 is vertically moved by the driving motor 14, the piston rod of the balancing actuator 33 is moved to thereby move the tool magazine 21 synchronously with the spindle head 13.

Figure 4:
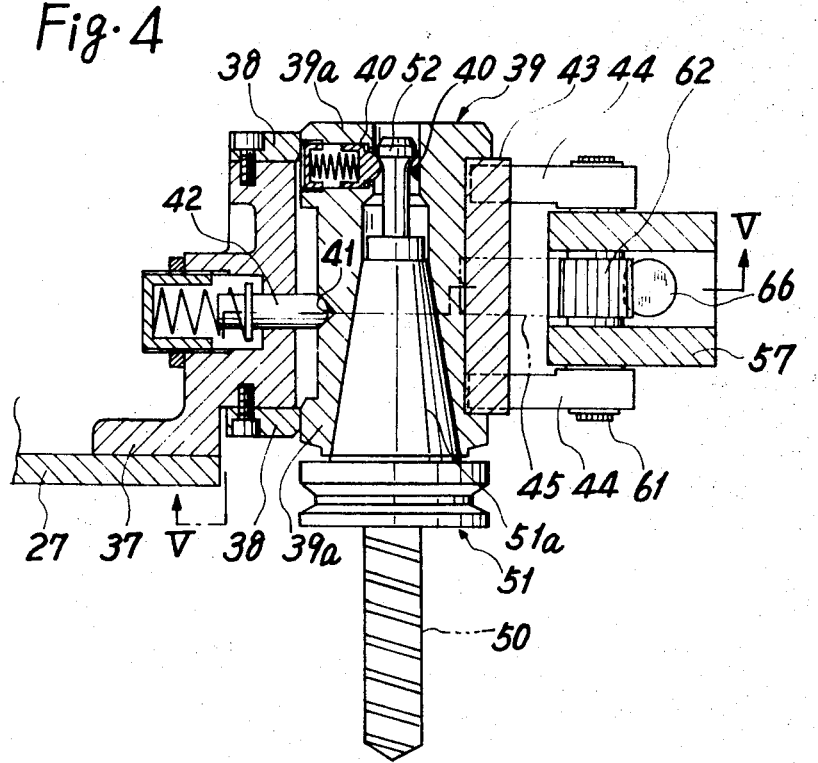
FIG. 4 is a sectional view on an enlarged scale taken along the line IV—IV in FIG. 2.
Figure 5:
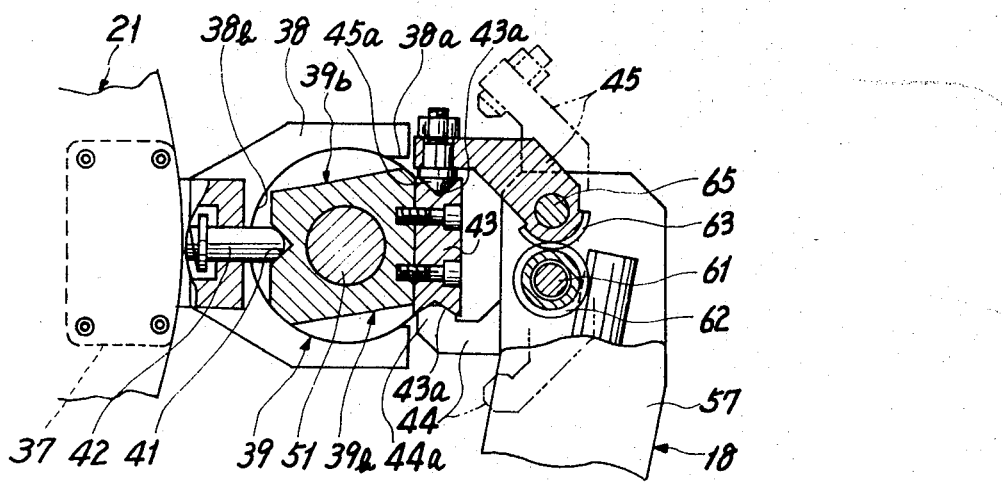
FIG. 5 is a sectional view taken along the line V—V in FIG. 4.

Referring now to FIGS. 4 and 5, the tool holding devices 28 on the magazine disc 27 may be described in detail as follows hereinbelow.

A plurality of supporting blocks 37 are mounted on the periphery of the magazine disc 27 which is rotatable in clockwise and counterclockwise directions to index a required tool into a tool transfer position where the fingers 44 and 45 on the sub-transfer arm 57 may clamp the tool sleeve 39 so that the tool sleeve may be transferred from the tool magazine to the sub-transfer arm 57. A pair of holding plates 38 are fixedly mounted on the supporting blocks 37 at both ends thereof. Each of the holding plates 38 is provided with a circular receiving portion 38b and an open peripheral portion 38a.

The shank portion 51a of the tool holder 51 having the tool 50 therein is demountably mounted in the tool sleeve 39 in which a pair of detent pins 40 is mounted and urged toward a pull-stud 52 of the tool holder 51 by compression springs so that the tool holder is not easily disengaged from the tool sleeve 39.

Enlarged portions 39a are provided at the both ends of the tool sleeve 39 having the same diameter as those of the receiving portions 38b and therefore, when the enlarged portions 39a are engaged with the receiving portions 38b, the tool sleeve 39 is not subject to being removed from the holding plates 38 in a radial direction, or a rightward direction, even because of centrifugal force being applied to the tool sleeve 39 when the tool magazine 21 is rotated for indexing.

Recessed portions 39b are provided on the tool sleeve 39 intermediate its ends, and removal of the tool sleeve 39 through the opening portion 38a in a radial direction is thereby facilitated when the same is first moved in an axial direction to make the recessed portion 39b correspond to the holding plate 38.

Provided in facing relation to the supporting block 37 on the tool sleeve 39 is a depression 41 into which a plunger 42 mounted on the supporting block 37 is elastically urged so that the tool sleeve 39 cannot be moved axially thereof, which thereby normally holds the same in fixed position in the holding plate 38.

Fixedly mounted on the side diametrically opposite the depression 41 is a holding block 43 which is clamped by the fingers 44 and 45 at opposed grooves 43a formed therein, so that the tool holder 51 and the tool sleeve 39 may be transferred from the tool magazine to the tool change position 90.

It is to be appreciated that, in this particular embodiment, the tool sleeve 39 is clamped at the holding block 43 so that the fingers 44 and 45 do not enter into the holding plates 38, thus avoiding interference between the fingers and the tool sleeve in that neighborhood and thereby increasing the number of tool sleeves permitted to be stored in the tool magazine 21, but that it is also possible to clamp the tool sleeve 39 itself by the fingers 44 and 45, if desired.

Referring now to FIGS. 2-6, the intermediate transfer device 18 will now be described.

Fixedly mounted on the spindle head 13 is a supporting block 46 to which a housing 47 is secured. A stationary member 48 is, in turn, secured to the housing 47. A movable member 49 is rotatably and axially movably mounted between the housing 47 and the stationary member 48 and is provided with a pinion gear 49a thereon.

A fluid actuator 53 is disposed in the stationary member 48 having a piston 54 slidably disposed therein, and a piston rod 55 is integrally formed with the piston 54 in a usual manner. Rotation of the piston 54 and its rod 55 is prevented by a detent pin 56 secured thereto through the stationary member 48. The sub-transfer arm 57 is connected to the piston rod 55 and the movable member 49 in such a manner that relative rotation thereof with the piston rod 55 only is permitted, while such relative movement with the movable member 49 is prevented. Consequently, when the piston 54 in the actuator 53 is moved in the axial direction, the sub-transfer arm 57 and the piston rod 55 are integrally moved in the axial direction.

A piston 59 with a rack 58 which is meshingly engaged with the pinion gear 49a is slidably mounted in another actuator 60 provided in the housing 47 which operates to rotate the sub-transfer arm 57 under the control of a conventional changeover valve, not shown.

A pair of limit switches 71a and 71b are respectively actuated by a pair of dogs 70a and 70b adjustably positioned on a threaded rod 73 extending from the piston 59, whereby the movement of the piston 59 is confirmed at both ends thereof.

At the one end of the sub-transfer arm 57, the fingers 44 and 45 are pivotably mounted, that is, the lower fingers 44 are fixedly mounted on a spline shaft 61 rotatably mounted on the sub-transfer arm 57 and provided with a pinion 62. The upper finger 45 is also pivotably mounted on the sub-transfer arm 57 and is provided with a sector gear 63 which is meshingly engaged with the pinion gear 62.

Provided respectively at the one end of the fingers 44 and 45 are engaging portions 44a and 45a, FIG. 5, which are engageable with the grooves 43a on the holding block 43.

Figure 2:
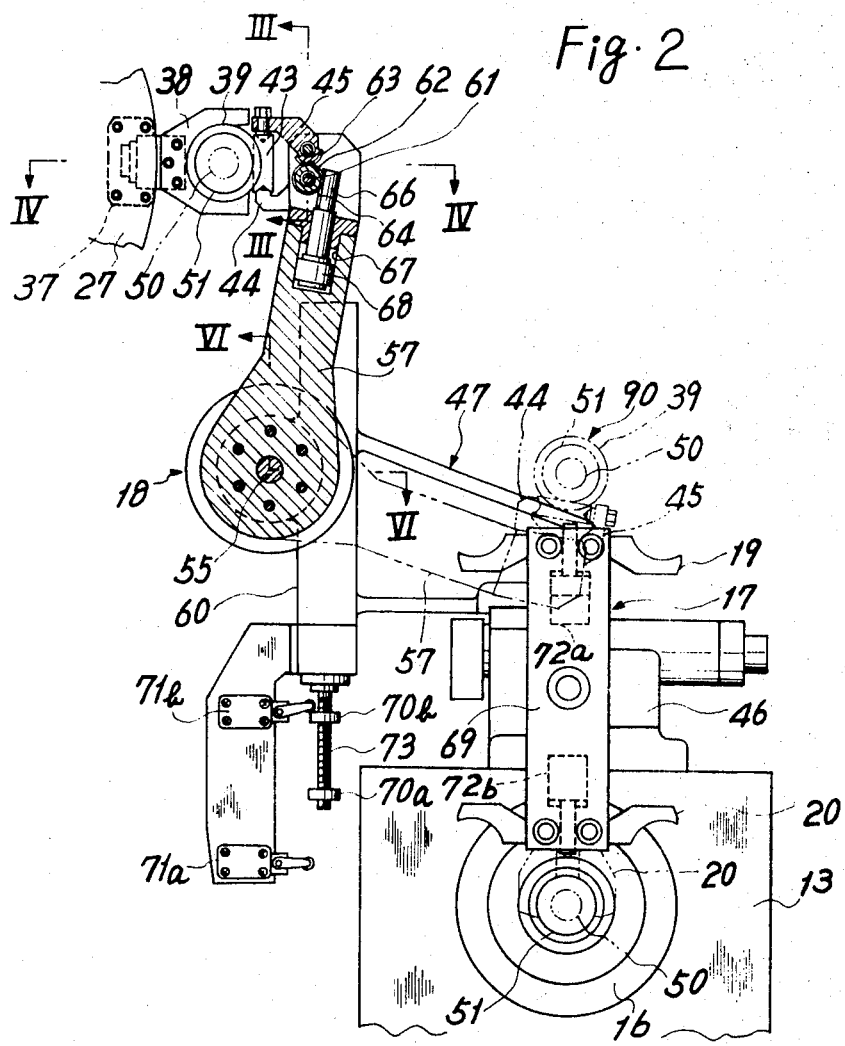
FIG. 2 shows the automatic tool change apparatus of the invention, partly in section.
Figure 3:
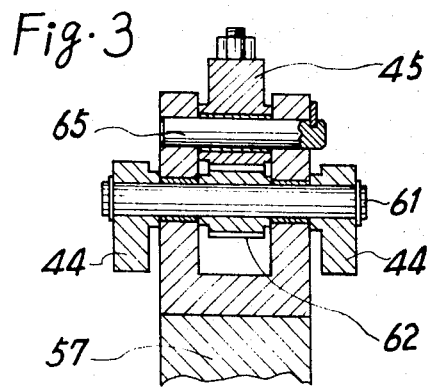
FIG. 3 is a sectional view on an enlarged scale showing tool sleeve clamping fingers, taken along the line III—III in FIG. 2.

A piston rod 66 with a rack 64, which is meshingly engaged with the pinion gear 62, is connected to a piston 68 which is slidably disposed in an actuator 67 provided on the sub-transfer arm 57, such that when the piston 68 is moved upwardly, FIG. 2, the fingers 44 and 45 are moved into the open position, or the position shown in phantom in FIG. 5, so as to leave the tool sleeve 39 in the holding plates 38.

It is to be noted that when the fingers 44 and 45 are positioned in the open position, the tool magazine 21 is freely rotatable without interference with the intermediate transfer device 18.

In operation, upon the completion of a predetermined machining operation by the tool 50, rotation of the spindle 16 is stopped and a tool change command signal is applied to appropriate control elements of the machine tool by the control apparatus thereof. According to the tool change command signal, the sub-transfer arm 57 is rotated by the actuator 60 to transfer a fresh tool in a tool sleeve 39 from the tool magazine. When the tool sleeve 39 has been transferred to the tool change position 90, the dog 70a actuates the limit switch 71a. By the signal from the limit switch 71a, the fingers 19 and 20 are closed by the actuators 72a and 72b so as to grip the tool holder 51 on the sub-transfer arm 57 and the tool holder 51 on the tool spindle 16, respectively, and then, the tool transfer arm 69 is moved axially to thereby draw out the tool holders from the tool spindle 16 and the tool sleeve 39 held by the fingers 44 and 45, and subsequently is turned through 180° in a clockwise direction, as seen in FIG. 1, and then retracted in the axial direction, whereby the tool holder previously held in the spindle 16 is inserted in the tool sleeve 39 and the fresh tool holder is inserted into the tool spindle 16.

The fresh tool holder 51 is clamped at the pull stud 52 by a clamping device contained in the tool spindle 16. Thereafter, the fingers 19 and 20 are opened and the tool spindle 16 is driven to carry out a predetermined machining operation by the fresh tool.

The tool transfer operation by the sub-transfer arm 57 is started when the fingers 19 and 20 are opened. The sub-transfer arm 57 is turned in a counterclockwise direction from the tool change position 90 to the upright position, or the tool transfer position, by the actuator 60 through the rack 58 and the pinion 49a. When the sub-transfer arm 57 has been brought into the tool transfer position, the limit switch 71b is actuated by the dog 70b whereupon the piston 54 is retracted so that the sub-transfer arm 57 is also retracted, whereby the tool sleeve 39 is axially moved, and thus the enlarged portions 39a are engaged with the holding plates 38 and the plunger 42 is engaged with the depression 41, that is, the tool sleeve 39 is tightly stored in the tool holding device 28. Thereafter, the piston 68 is upwardly moved to liberate the tool sleeve 39 from the fingers 44 and 45.

According to the numerical control data, the tool magazine 21 is rotated by the indexing mechanism to index a tool selected for another succeeding machining operation into the tool transfer position. Thereafter, the piston 68 in the actuator 67 is moved down, and the indexed tool sleeve 39 having a tool is clamped by the fingers 44 and 45.

Figure 6:
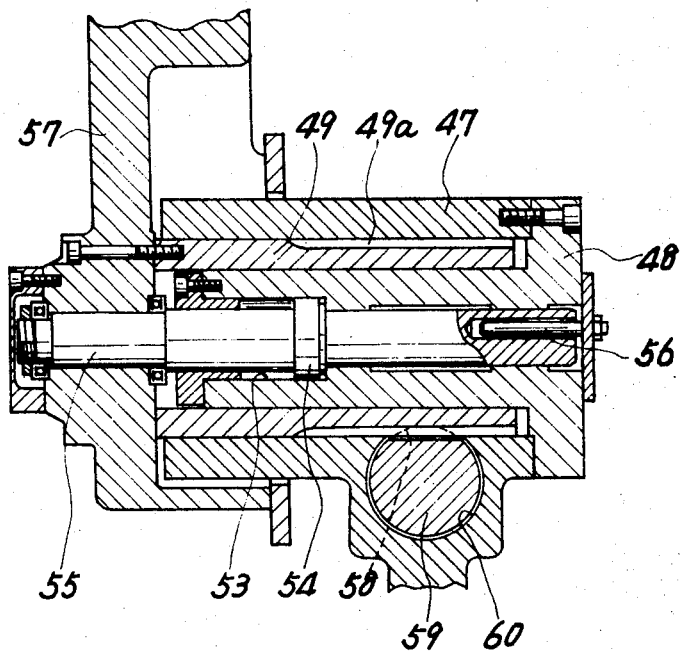
FIG. 6 is a sectional view on an enlarged scale taken along the line VI—VI in FIG. 2.

Upon the completion of clamping of the fingers 44 and 45, the sub-transfer arm 57 is moved to the right, FIG. 6, by means of the actuator 53 through a predetermined distance, and therefore, the enlarged portions 39a are disengaged from the receiving portion 38b of the hold plate 38. In this state, the sub-transfer arm 57 waits till the next tool change operation is required. When the tool change operation is required, the tools are interchanged in a manner as above described.

It is, of course, possible to transfer the indexed sleeve 39 into the tool change position before the next tool change operation is required.

Obviously, many modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. An automatic tool change apparatus comprising:

a tool magazine for storing a plurality of tools and for indexing a required tool into a predetermined position;

tool holding means mounted on said tool magazine and provided with opening and receiving portions;

a plurality of tool sleeve means each for holding a tool and each having first and second portions, each of said tool sleeve means being held by said receiving portions of said tool holding means at said first portion thereof and removable therefrom through said opening at said second portion;

first tool transfer means movable in two directions so as to transfer one of said tool sleeve means along with a tool from said tool holding means to a tool change position, said first tool transfer means being capable of aligning said second portion of said one of said tool sleeve means with said opening by a motion in one of said two directions; and second tool transfer means for interchanging tools between said tool sleeve means in said tool change position and a tool spindle, when a machining operation by a previous tool is completed.

2. An automatic tool change apparatus according to claim 1, wherein:

said first portion of each of said tool sleeve means is an enlarged portion for engaging said tool holding means;

said second portion of each of said tool sleeve means is a recessed portion having a smaller diameter than that of said enlarged portion; and further comprising, detent means in each of said tool sleeve means elastically urged toward a tool holder disposed therein to hold the same in said tool sleeve means.

3. An automatic tool change apparatus according to claim 1, wherein said first tool transfer means comprises:

a sub-transfer arm having fingers for clamping one of said tool sleeve means; and actuator means for moving said sub-transfer arm to shift said clamped one of said tool sleeve means in an axial direction in said tool holding means and for rotating said sub-transfer arm between said tool holding means and said tool change position.

4. An automatic tool change apparatus according to claim 2, wherein said first tool transfer means comprises:

a sub-transfer arm having fingers for clamping one of said tool sleeve means;

first actuator means for disengaging said enlarged portion from said tool holding means by moving said sub-transfer arm in one direction; and second actuator means for transferring said one of said tool sleeve means from said tool holding means in the tool change position by moving said sub-transfer arm in a second direction.

5. An automatic tool change apparatus according to claim 1, wherein said tool holding means comprises:
   a support for said tool holder having a pair of support plates, each of which has a limited width and is disengaged from said tool sleeve means when said tool sleeve means is moved in an axial direction thereof by said first tool transfer means; and
   a plunger in said support being elastically urged toward said tool sleeve means so as to prevent axial movement of said tool sleeve means therein.

6. An automatic tool change apparatus comprising:
   a tool magazine for storing a plurality of tools and for indexing a required tool into a predetermined position;
   a plurality of tool holding means mounted on said tool magazine and provided with opening and receiving portions;
   a plurality of tool sleeves each having enlarged portions at both ends thereof and a recessed portion intermediate said both ends for holding a tool, said enlarged portions being engaged with said receiving portions of said tool holding means and said recessed portion permitting passage through said opening portions of said tool holding means;
   a plunger for each of said tool holding means mounted on said tool magazine being elastically urged toward said tool sleeve engaged therein to normally prevent axial movement of said tool sleeve;
   a sub-transfer arm having fingers for clamping said tool sleeve;
   first actuator means for disengaging said enlarged portions of said tool sleeves from said receiving portions of said tool holding means and making said recessed portions of said tool sleeves correspond to said opening portions of said tool holding means;
   second actuator means for transferring said tool sleeves from said tool holding means to a tool change position by moving said sub-transfer arm; and
   a tool transfer arm for interchanging tools between the sub-transfer arm in said tool change position and a tool spindle.

7. An automatic tool change apparatus according to claim 1, wherein:
   said tool holding means are arranged on a circular peripheral portion of said tool magazine;
   each of said tool sleeve means is provided with a holding portion extending outwardly from said tool holding means; and
   said first tool transfer means is provided with a pair of fingers which are moveable in a tangential direction of said tool holding means for clamping said holding portion outside of said tool holding means.

* * * * *